United States Patent [19]

Wolf

[11] Patent Number: 4,621,759

[45] Date of Patent: Nov. 11, 1986

[54] APPARATUS FOR JOINING MUTUALLY CONTACTING BEAMS OR THE LIKE BY MEANS OF NAIL SLABS

[75] Inventor: Johann Wolf, Scharnstein, Austria

[73] Assignee: Johann Wolf Gesellschaft m. b. H., Scharnstein, Austria

[21] Appl. No.: 734,537

[22] Filed: May 16, 1985

[30] Foreign Application Priority Data

May 16, 1984 [AT] Austria ................................. 1619/84

[51] Int. Cl.⁴ .............................................. B27F 7/15
[52] U.S. Cl. ..................................... 227/152; 100/913
[58] Field of Search ............... 100/DIG. 13; 227/101, 227/103, 152

[56] References Cited

U.S. PATENT DOCUMENTS

| | | | |
|---|---|---|---|
| 3,716,179 | 2/1973 | Frydenberg et al. | 227/152 X |
| 3,804,316 | 4/1976 | Kay | 227/152 X |
| 4,287,822 | 9/1981 | Bowser | 227/152 X |

FOREIGN PATENT DOCUMENTS 703327 12/1979 U.S.S.R. ................................. 227/152

*Primary Examiner*—Paul A. Bell
*Attorney, Agent, or Firm*—Young & Thompson

[57] ABSTRACT

In an apparatus for joining two or more longitudinally oriented beams (1) or the like into girders by prefabricated nail slabs (2), feeding devices (6) and guide means (7) are arranged in front of and behind a table (5) designed for supporting the beams (1), for the feeding and supporting, respectively, and for the alignment of the beams (1) or the like to be joined; a compressing device (8) is arranged above the table (5) for pressing the beams (1) or the like together and/or for pressing the beams against the table (5); and pressing boards (9) are arranged on both sides of the table and/or of the beams (1) or the like to be joined, these pressing boards carrying retainers (10) for the nail slabs (2). The pressing boards (9) extending over the entire vertical extension of the beams (1) or the like to be joined are connected together for the execution of opposite movements.

10 Claims, 4 Drawing Figures

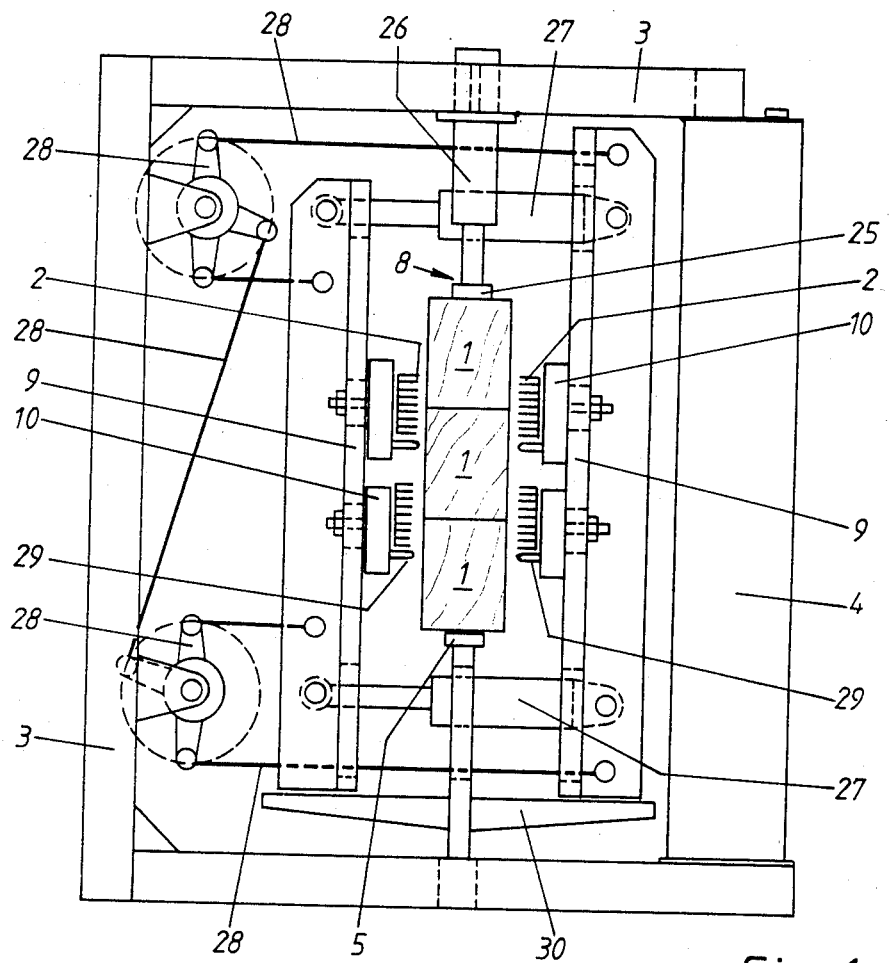
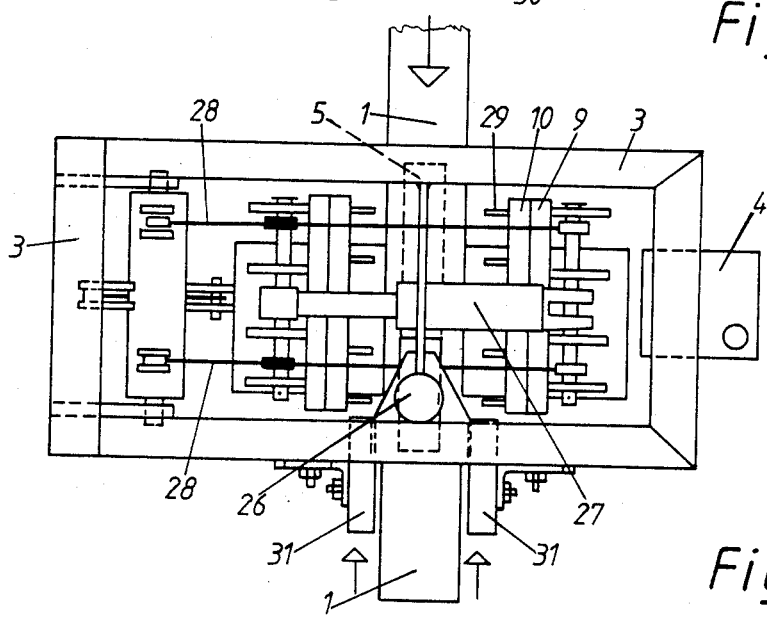
Fig. 1
Fig. 2

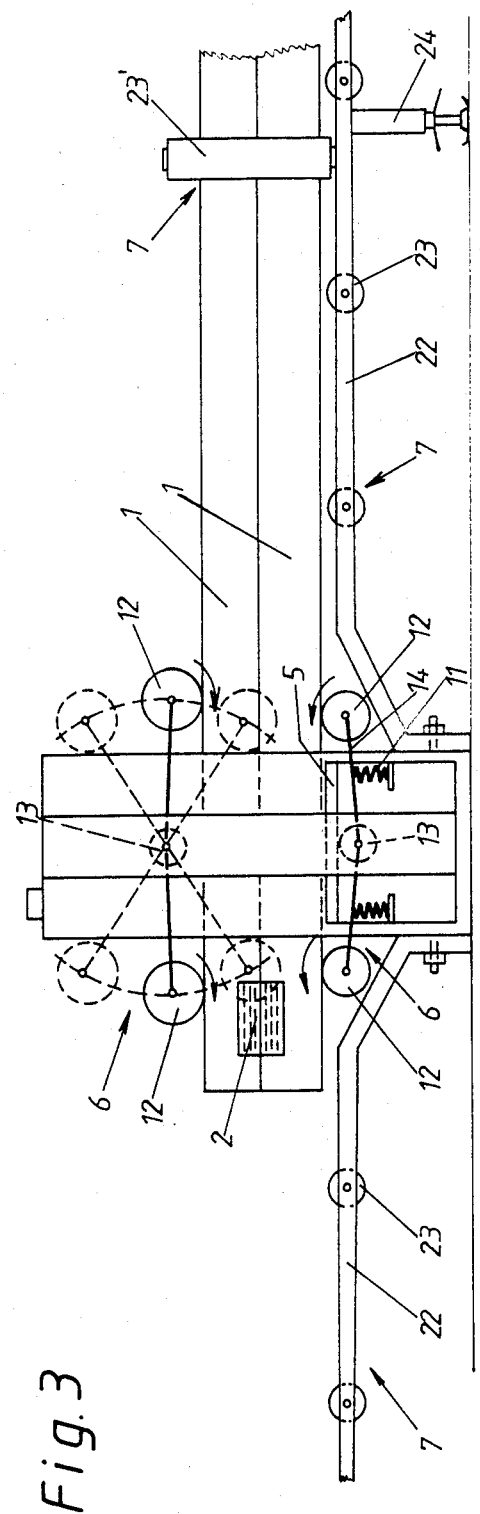
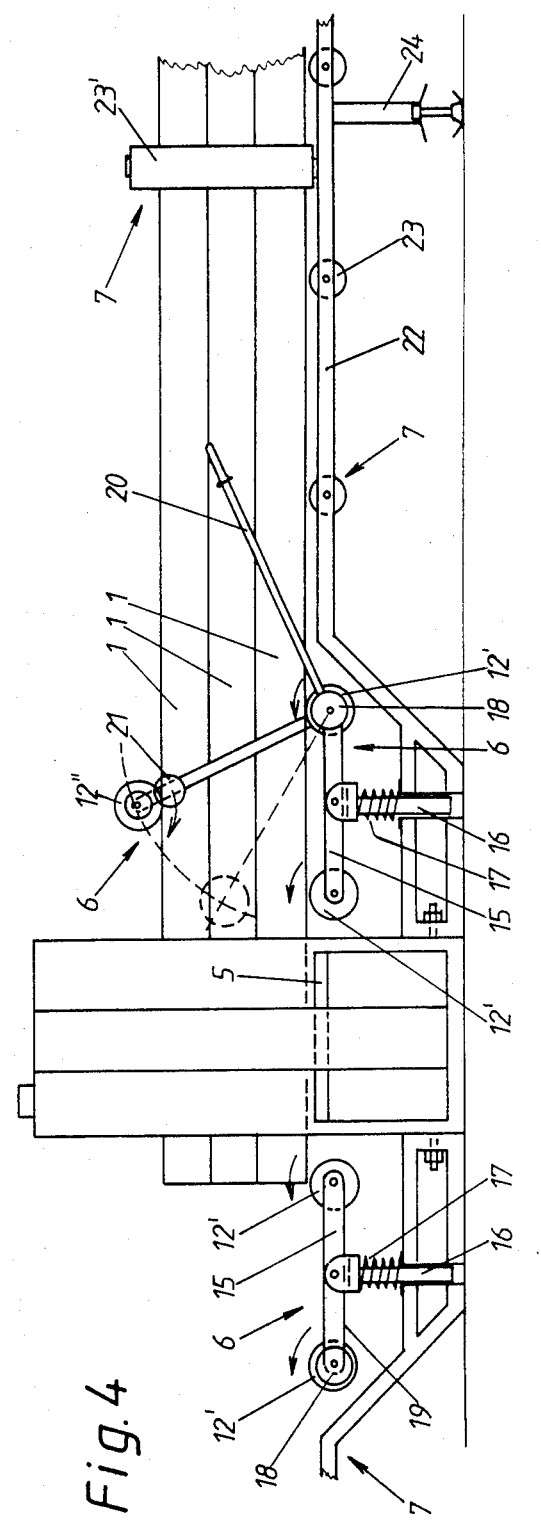

APPARATUS FOR JOINING MUTUALLY CONTACTING BEAMS OR THE LIKE BY MEANS OF NAIL SLABS

The invention relates to an apparatus for connecting two or more longitudinally oriented beams or the like into girders by means of prefabricated nail slabs.

When pressing nail slabs into place with a conventional mechanical or hydraulic press, it can happen that the beams or the like are not resting flush one or the other at the nailing sites, which can lead to pulling out of the nail slabs in case of stress. Besides, when relatively large beam are nailed, the beams are difficult to handle, and pressing the nail slabs into place becomes time-consuming on account of this.

Installations have been known from British Pat. Nos. 1,442,148 and 1,515,032 for the production of frames, especially for bed frame with wire springs, wherein the frame sides and the slats form butt joints and are connected at the junction sites by means of nail boards.

In this connection, the nail boards are to be made by the severing of strips provided with prepunched teeth and wound up on reels.

In contrast thereto, the invention is based on the object of providing an apparatus for connecting two or more longitudinally oriented beams or the like into girders along their linear, essentially planar contact surfaces by means of prefabricated nail slabs, ensuring during this step a flush superposition by an immovable retention of the beams or the like. A reliable performance of this task is important for the extent to which the thus-manufactured girder can be placed under load.

In attaining this object, the apparatus of this invention is characterized in that feeding devices and guide means are arranged in front of and behind a table designed for supporting the beams, for the feeding and supporting, respectively, and for the alignment of the beams or the like to be joined together; a compressing device is arranged above the table for pressing the beams or the like together and/or for pressing the beams against the table; and pressing boards are arranged on both sides of the table and thus on both sides of the beams or the like to be joined, these pressing boards carrying retainers for the slabs, adjustable to the junction plane or planes of the beams or the like, wherein the pressing boards, which extend past the entire vertical extension of the beams or the like to be joined, are interconnected to execute a combined, opposite movement by hydraulic cylinders located above and below the beams or the like to be joined and by a lever linkage preferably supported in a rack of the apparatus, as a parallel guide means.

An essential feature of the apparatus of this invention is to be seen in that feeding devices and guide means are disposed in front of and behind a table designed as a support for the means or the like, for the feeding as well as supporting of the beams or the like to be joined together; a compressing device is arranged above the table for pressing the beams together and/or for pressing the beams against the table; and platens are disposed laterally of the table, these platens being provided with retainers for the nail slabs and being movable toward the beams or the like. A secured and permanent joining of beams or the like can be established with the aid of an apparatus constructed in this way.

Details and additional features of the feeding devices, the guide means, and the compressing device and pressing means for the beams or the like, the pressing unit for the nail slabs, the control, as well as the structure of a rack can be seen from the accompanying drawings, considered in conjunction with the description of the invention referring to practical examples.

The apparatus of this invention makes it possible to join beams of different thickness and also two or more beams, but in each case beams of the same size. The size of the prefabricated nail slabs likewise depends on the thickness of the beams and is also of differently large dimensions. Since the center of the nail slab is always to lie on the junction plane of two beams in order to establish a perfect connection, the retainers are designed to be adjustable and fixable in their vertical position with respect to the pressing boards.

Normally, two or three beams are nailed together to form a girder. Correspondingly, respectively two retainers are mounted one above the other on the left-hand and right-hand sides of the passing-by beams. The number of retainers and guide plates can be increased if a larger number of beams is to be joined together.

The nail slabs present in the retainers are individually inserted before each nailing step together with the subsequent nail slab that is inserted in the retainer. The operator is not endangered during insertion of the nail slabs since the operator cannot reach behind the platens, and the retainer is not moved during the pressing step. The retainer is dimensioned so that it can readily accommodate the nail slabs, but it is impossible to extend a hand into the nail space.

The retainers for the nail slabs can also be fashioned as magazines for a larger number of nail slabs, so that the operator needs only to replenish the magazines from time to time. Insertion of the individual nail slabs in the pressing zone can likewise take place mechanically, for example with the aid of a small reciprocating cylinder.

The beams are placed on the inlet side in superposition on the guide means, seized by the feeding devices, and pulled in between the opened pressing boards to the desired extent. The drive of the feeding devices is suitably performed hydraulically with a hydraulic motor (on account of the frequent off and on operation). During the feeding of the beams, the nail slabs are inserted in the pressing zone manually or automatically. Directly after interruption of the feeding step, the compressing device, movable vertically with respect to the table, is pressed against the beams so that the latter are pressed flush into contact with each other. During the subsequent nailing step, the platens and the retainers connected therewith are vigorously forced against each other, during which step the nail slabs are pressed into the beams. The opposed motion of the platens is likewise effected by means of a hydraulic cylinder via a parallel guide means, or with respectively one cylinder lying above and below the pressing boards, which cylinders are connected to a parallel guide means.

After termination of the nailing operation, the compressing device and the platens are returned into their initial position, and the feeding device is activated until the beams with the subsequent nailing site are disposed in the pressing zone. The course of the individual operations is repeated with each nailing site in the same way and consists of the cycles: interruption of feed—compressing the beams against the table—contraction of the platens (impressing the nail slabs)—retraction of the compressing plates and platens into the initial position—activation of feed. This constantly repeated process is controlled mechanically by means of a cam roll actuating the individual valve tappets, or electrically by means of regulated solenoid valves. The hydraulic feed drive mechanism is interrupted by rerouting the oil flow via a multiple-way valve. By way of this valve, the feed mechanism is connected and disconnected, and, in the disconnected condition, the oil stream drives a small hydraulic motor for driving the cam roll. After one revolution of the cam roll (complete course of the nailing operation), the cam roll switches the multiple-way valve again into the feeding mode.

Utilization of the nail slabs in accordance with static requirements makes it necessary to provide smaller spacings of the nail slabs at the ends of the beams than in the central region. This necessitates, in the entering beam half, increasingly greater distances of the nail stabs from one another and, in the second half, conversely smaller spacings of the nail slabs. In other words, according to static calculation, the spacings of the nail slabs are predetermined and differ from each other.

For controlling the differently large feeding steps, various installations are provided. In the simplest form, control is effected manually and/or by means of a pedal in conjunction with a visual or stepwise acoustic length indication of the beam feed. A practical arrangement of this type consists of a scanning wheel which, in a spring-loaded fashion, presses on the traveling beam and is entrained during feeding of the beam. By means of an adapted reduction gearing, the rotation of the scanning wheel in correspondence with the feeding of the beam is indicated on a circular dial or digitally in centimers etc. With the aid of this indication, and the predetermined static plan wherein the spacings of the nail slabs are fixed, these slabs are set by manually triggering the nailing process.

The provision can be made in a further embodiment of the control arrangement that the traveling route of the scanning wheel along the beam is transmitted to an index disk or rail. The indices on the disk or rail respectively trigger interruption of the feed, whereupon the nailing step proceeds as described above. A corresponding index disk must be made for each beam length and/or nail slab plan. For purposes of simplification, bores or humps can serve as markings on the index disk.

In a preferred embodiment of the control for the nailing processing, the feed units are controlled electrically. The beam length and the successive spacings of the individual nail slabs are fed into an electronic memory unit which transmits the corresponding pulses by way of switching relays coupled with solenoid valves. Any beam length and any desired spacing of the nail slabs can be put in with the aid of this memory, so that thereby optimum adaptation is provided and the operator is greatly relieved. In this embodiment of the feed control, the above-described course of the nailing operation is likewise regulated with the aid of an electronic component. This electronic control can also be equipped with fixed feeding data. The individual spacing values (e.g. 20, 30, 40 and 60 cm) can be actuated by means of push buttons.

The invention will be described with reference to embodiments, shown schematically in the drawings, of an apparatus for joining beams, without restriction to details.

In the drawings:

FIG. 1 is a frontal view of a nailing machine with beams and nail slabs inserted, FIG. 2 is a top view of FIG. 1, FIGS. 3 and 4 show embodiments of feeding u. and guide means for the beams to be joined, in a lateral view.

The apparatus of this invention for joining mutually contacting beams 1 or the like with the use of nail slabs 2 comprises a rack 3, one stand of which is designed in the form of a box girder 4 as an oil tank. The rack 3 accommodates a fixed, optionally also mobile, table 5 of a rectangular configuration serving for suporting the beams 1 or the like. Along the narrow sides of the table 5, feeding units 6 are arranged for advancing the beams 1 or the like to be joined together, on the one hand, and guide means 7 are provided, on the other hand, for the supporting and alignment of the beams. Above the table 5, the rack 3 carries a compressing device 8, with the aid of which the beams 1 or the like to be joined are pressed against each other and against the table 5. Finally, laterally of the table 5 and thus laterally of the beams 1 or the like to be joined, pressing boards 9 are arranged to be movable toward the beams 1 or the like, these boards being equipped with retainers 10 for the nail slabs 2.

The feeding unit 6 according to FIG. 3 consists of nonskid rolls 12 provided in front of and behind the table 5 and thus also in front of and behind the pressing boards 9; these rolls are mounted to one-armed control arms 14 and are urged against the underside of the beams 1 or the like by springs 11 acting against the control arms 14. The rolls 12 are driven in the direction of the indicated arrows by means of a hydraulic motor 13, for example by a chain drive, not shown in detail. The lower rolls 12 extend with their outer surface a slight extent past the surface of the table 5 in order to lift off the beams 1 or the like during feeding and thus to relieve the load. During the pressing of the beams 1 or the like against the table 5 directly before and during the impressing of the nail slabs 2, the rolls 12 yield downwardly against the tension of the springs 11. The rolls 12 acting against the topside of the beams 1 or the like are adjustable within a large range for adaptation to different beam thicknesses and/or numbers and are driven by a hydraulic motor 13 in opposition along the lines of the illustrated arrows by way of a quadrant or articulated shafts. These rolls 12 are urged against the beams 1 or the like, for example, by their own corresponding weights and/or by weighting means, or also by means of springs; they exhibit a larger diameter than the lower rolls.

The guide means 7 for the beams 1 or the like according to FIGS. 3 and 4 consist of cantilevers 22 attached to the narrow sides of the table 5 and connected to the rack 3; these cantilevers are studded with freely rotatable rolls or rollers 23 and can optionally be extensible to the length of the beam. A vertical adjustment of this guide means is possible with the aid of a supporting beam 24. For the lateral guidance of the beams 1 or the like, optionally also for the advancing of especially heavy beams or the like, rolls 23' are provided which stand upright.

The feeding unit 6 according to FIG. 4 consists of pairs of rolls 12' arranged in front of and behind the table 5, optionally also of several rolls, forming a unit with the guide means 6 and adapted to come into contact with and to be attached to the nailing machine. The rolls 12' are supported on two-armed control arms 15 articulated with limited pendulating ability at a vertical guide means 16, the rolls 12' being urged against the underside of the beams 1 or the like by means of springs 17. A hydraulic motor 18 and a chain drive mechanism 19 are provided for driving the rolls 12' in the direction of the arrows. At least one roll 12" acts from above against the beams 1 or the like on account of its own weight, weighting means, or springs; this roll is driven by means of a chain drive and by way of spur gears 21 by another hydraulic motor 18. A hand lever 20 is arranged for lifting the top roll 12" during insertion of beams 1 or the like.

The compression device 8 for the beams 1 or the like, illustrated in FIGS. 1 and 2, and/or its pressure exertion on the table 5 consists of a contact pressure plate 25 which is pressed, by means of a hydraulic cylinder 26, against the topside of the beams 1 or the like. After compressing the beams 1 or the like and/or after pressing the latter against the table 5, an opposite motion, oriented against the beams 1 or the like, is executed by the pressing boards 9, pressing the nail slabs 2 into place. This motion is effected by hydraulic cylinders 27 connecting the two pressing boards 9, a parallel guidance being ensured by lever linkages 28, support being provided by bearings 30. The nail slabs 2 are held during the pressing-in step by retainers 10, adjustably connected to the pressing boards 9 with the use of resilient pins 29, the pins 29 being adapted to spring back. The adjustability of the retainers 10 makes it possible to align the nail slabs 2 respectively with the junction plane of two beams 1 or the like. For supplying nail slabs 2 to the retainers 10, pocket-like guide means 31 are arranged on the rack 3, namely to be laterally adjustable for considering the width of the beams 1 or the like to be connected, and to be vertically adjustable, for the purpose of orientation to the connecting plane of the beams 1 or the like, in total for providing alignment with the retainers 10 and their pins 29, respectively.

The illustrated and described embodiments of a nailing machine serve merely for explaining the basic aspect of the invention without restricting the latter to details. Thus, it is also possible, for example, to arrange the machine in a horizontal position, the table then being oriented perpendicularly, and the pressing boards being in a horizontal orientation.

I claim:

1. Apparatus for connecting a plurality of longitudinal beams into girders by means of prefabricated nail slabs, comprising means for feeding a plurality of superposed beams into a nailing station, means for supporting said beams from below in said nailing station, means for pressing downwardly on said beams in said nailing station, means for pressing prefabricated nail slabs into said beams from opposite sides of said beams thereby to integrate said beams into a girder, rollers rotatable about horizontal axes disposed on opposite sides of said supporting means, and yieldable means urging said rollers to an elevation higher than said supporting means, said yieldable means yielding against the pressure of said downwardly pressing means to lower said beams onto said supporting means.

2. Apparatus as claimed in claim 1, and upright platens for applying said nail slabs to the beams, said platens extending vertically above and below the beams, and hydraulic cylinders disposed above and below the beams and acting on said platens to move said platens toward and away from each other.

3. Apparatus as claimed in claim 2, said hydraulic cylinders being interconnected at opposite ends to said platens on opposite sides of said beams.

4. Apparatus as claimed in claim 2, and linkage means guiding said platens for maintaining said platens parallel to each other during movement of said platens toward and away from each other.

5. Apparatus as claimed in claim 1, each of said roller being disposed at the end of an arm which is pivotally mounted at its other end for vertical swinging movement, said yieldable means acting on said arm to urge it to swing upwardly.

6. Apparatus as claimed in claim 1, said rollers being mounted on opposite ends of an arm pivotablly mounted intermediate its ends on a vertical guide means that is spring urged upwardly.

7. Apparatus as claimed in claim 1, and rollers acting from above against the beams, and a handle lever for lifting said rollers.

8. Apparatus as claimed in claim 1, and rollers rotatable about horizontal axes on which said beams roll into and out of said nailing station, and rollers rotatable about vertical axes for laterally guiding said beams.

9. Apparatus as claimed in claim 1, said downwardly pressing means comprising a pressing platen and a hydraulic cylinder for pushing said pressing platen downward.

10. Apparatus as claimed in claim 1, and power means for rotating said rollers to feed said beams horizontally into and through said nailing station.

* * * * *